(12) United States Patent
Van Oorschot

(10) Patent No.: US 6,317,829 B1
(45) Date of Patent: Nov. 13, 2001

(54) PUBLIC KEY CRYPTOGRAPHY BASED SECURITY SYSTEM TO FACILITATE SECURE ROAMING OF USERS

(75) Inventor: Paul C. Van Oorschot, Ottawa (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 09/099,840

(22) Filed: Jun. 19, 1998

(51) Int. Cl.[7] .................................................. G06F 11/30
(52) U.S. Cl. .......................... 713/155; 713/161; 713/168; 713/170
(58) Field of Search ................................. 713/155, 161, 713/168, 170, 182

(56) References Cited

U.S. PATENT DOCUMENTS

| | | | |
|---|---|---|---|
| 5,495,533 | * 2/1996 | Linehan | 380/21 |
| 5,892,828 | * 4/1999 | Perlman | 380/25 |
| 5,933,503 | * 8/1999 | Schell et al. | 380/25 |
| 5,968,177 | * 10/1999 | Batten-Carew et al. | 713/201 |
| 5,974,151 | * 10/1999 | Slavin | 380/30 |
| 5,982,898 | * 11/1999 | Hsu et al. | 380/23 |
| 6,134,660 | * 10/2000 | Bonch et al. | 713/193 |

* cited by examiner

Primary Examiner—Thomas R. Peeso
(74) Attorney, Agent, or Firm—Vedder, Price, Kaufman & Kammholz

(57) ABSTRACT

A public key cryptography based security system and method stores decryption private key history data in a common directory accessible by roaming users, to facilitate roaming use of the encryption system. A security management server stores per user security data, such as decryption private key history data in a secure database as master copy data. A public repository unit stores remotely accessible per user security data including the decryption private key history data stored in the security management server. A second computing device, different from a primary computing device, communicates with the public repository unit to obtain the decryption private key history data to decrypt encrypted data associated with the primary computing device to facilitate portable security capability.

42 Claims, 3 Drawing Sheets

PUBLIC KEY CRYPTOGRAPHY BASED SECURITY SYSTEM TO FACILITATE SECURE ROAMING OF USERS

BACKGROUND OF THE INVENTION

The invention relates generally to systems employing cryptography based security, and more particularly to systems employing public key encryption.

Communication systems such as computer networks, telecommunication systems, and other systems are increasingly using cryptography to encrypt information sent electronically. With the increase in electronic commerce, electronic mail communication, and other information for which users may wish to keep secret, public key cryptography systems employ an encryption key pair, such as a decryption private key and an encryption public key to decrypt and encrypt data. The decryption private keys are secret keys that are protected by the use of encryption techniques and other techniques to help ensure that an attacker cannot readily obtain this critical key. In communications that employ many users, it is not uncommon that a given software application has its own encryption and decryption keys as well as the user of a computer.

As people move from location to location within large organizations having large networks employing public key cryptography, the associated decryption private key and encryption public key must also be securely transferred to another computer for example, or software application to allow the user to roam at different computers or applications within the system. In a more open environment, it may be desirable to have a user gain access to their encrypted e-mail or other data files stored in a server in one city from a terminal or networked computing device located across the country, or to set up encrypted communications sessions to other servers or users. In this way, a user may roam from one computer or application to another and still obtain encrypted information as though they are physically located at their home base. For example, where a user is traveling, access to their encrypted e-mail may be imperative in performing their job while remotely located. Similarly, from a computing station a user roams to, it may be desirable to have the ability to set up a secure communication session, in order to securely access and be able to decrypt sensitive information on a corporate server. Hence it would be desirable to provide an alternate computing unit that allows access to encrypted information at the home station.

Conventional public cryptography based security systems may store a user's decryption private key and other user-specific data, such as program settings or user preferences, in secure storage of a server or directory. The storage of such user-specific data in a centralized location accommodates central generation and/or updating of data. This allows updates to be locally accessible to the user from various locations, and may serve as a master copy in case the local data storage or program employing such data is lost or upgraded. Each time a user (subscriber) accesses the server/directory with appropriate identification or access permission, the subscriber obtains access to its user-specific data. A problem with such systems, is that there is typically no history of previous decryption private keys so a subscriber cannot read older encrypted data. For example if a previous e-mail was encrypted using an older encryption key of the subscriber, and the encryption key was subsequently updated or replaced after a period of time, which is common, the e-mail cannot be read using the new decryption private key because it is no longer paired with the older public encryption key.

To overcome this problem, other public key cryptography based security systems store the history of decryption private keys locally in a user's computer memory units and protect this information (for example by encryption) to avoid access by an attacker. In addition, the history of the decryption private keys is stored in a master copy form in the security manager server. In such a system however, such backed-up decryption private keys are only accessible through the manager server and not directly to the user.

Upon loss of a previous decryption private key, which may be 1,000 bits long (for example if the RSA algorithm is used), a subscriber or user identified as having the proper access for the community can be allowed to access the stored history data to obtain a previously lost decryption private key. A user may need to recover multiple keys, that is a key history, because the validity of certificates expires periodically, and thus over time users have a number of different key pairs. A new key pair is automatically generated either by the manager server or the user computer upon the expiration of the validity period of the certificates. In order for a user to obtain a copy of the key history from the manager server, the subscriber must prove through special procedures which provide access control, such as a manual telephone call or personal appearance or other mechanism to obtain a new password to gain access to the key history. Because access to the manager server key history is particularly sensitive, such procedures are typically designed to be inappropriate for frequent use, and therefore are inconvenient as a mechanism of regular access to the key history. Moreover, with such systems, if a user wishes to go to another computer or use another software application and still have the security privileges associated with the decryption private key of the home or primary computing unit, the user needs to carry a copy of the private decryption key with him/her for example on a diskette or smart card or other physical token, such as a hardware token. The use of physical or hardware tokens to ensure secrecy of decryption private keys can be inconvenient particularly if a user wishes to avoid losing the token when traveling, or finds it inconvenient to always carry such a token. In addition, if a new decryption key is assigned due to lapse of an expire period for the associated certificate while the user is traveling, the user would need to update the hardware token while away from home base. This can be impractical particularly when the information must be communicated securely to avoid detection by a potential attacker, and a mechanism for updating a physical token with new keying material may not be available or trusted on the roamed-to computing device.

Hence, where physical or hardware tokens such as key storage transport devices are used, a primary computing unit can securely store the decryption private key on the token. The user then carries the token and inserts it in another computing unit such as a laptop computer which has suitable security software to retrieve the decryption private key from the token. A public directory or other data file server is also typically in communication with the computing units to provide an encryption public key certificate corresponding to the decryption private key to ensure that the decryption private key is associated with a particular user or software application. However, such public repositories do not typically store any private keys to facilitate decryption of information.

Consequently there exists a need for a public key cryptography based security system to facilitate roaming use of the encryption system. In such a system, it would be desirable to provide the security privileges associated with the decryption private key for a user on alternate units. It would be desirable if the system allowed an alternate computing unit to participate in retrieving decryption private key information so that encrypted information may be evaluated or decrypted by a user using a different software application or computing station. A roaming unit or alternate unit should be able to use its own processor for decrypting information or for using decryption private key data.

DETAILED DESCRIPTION OF THE INVENTION

A public key cryptography based security system and method stores decryption private key history data in a common directory accessible by roaming users, to facilitate roaming use of the encryption system. A server, such as a security management server, also stores per user security data, such as decryption private key history data in a secure database as master copy data. A public repository unit, such as a server, stores remotely accessible per user security data including the decryption private key history data stored in the security management server. When the user is using the primary computing device, the primary computing device obtains the decryption private key history data from the public repository unit by either pulling the data therefrom or the public repository unit, releases or pushes, the decryption private key history data to the subscriber unit after obtaining identification or addressing information of the unit, so that the subscriber unit can decrypt encrypted data previously encrypted using the decryption key from the current or previously current encryption-decryption key pairs. In addition, an alternate computing device communicates with the public repository unit to obtain the decryption private key history data and to decrypt encrypted data that was accessible by the primary subscriber unit to facilitate portable security capability. The primary computing device may also obtain the decryption private key history from a security management server, and store, preferably using suitable protection (e.g. encryption), the key history in local storage for medium or long-term use. This may be more appropriate in the case where the primary computing device is regularly associated with a particular user.

If desired, the alternate computing unit may include a decryption private key history request generator to obtain the information from the public repository unit. The public repository unit may send the requested decryption private key history data to the alternate computing device in an encrypted format if desired. By storing not only decryption private key data in a publicly accessible repository, but also decryption private key history data, a user may gain security capabilities at remote locations to access, for example e-mails or other stored file data, in a directory that may have been digitally encrypted using old encryption keys. Hence older information may be archived and read from remote locations by a given roaming user. This may also facilitate ongoing communications with communications partners who may not yet have the user's new encryption key, or for any reason that continue for some period to use the user's older encryption keys.

Figure 1:
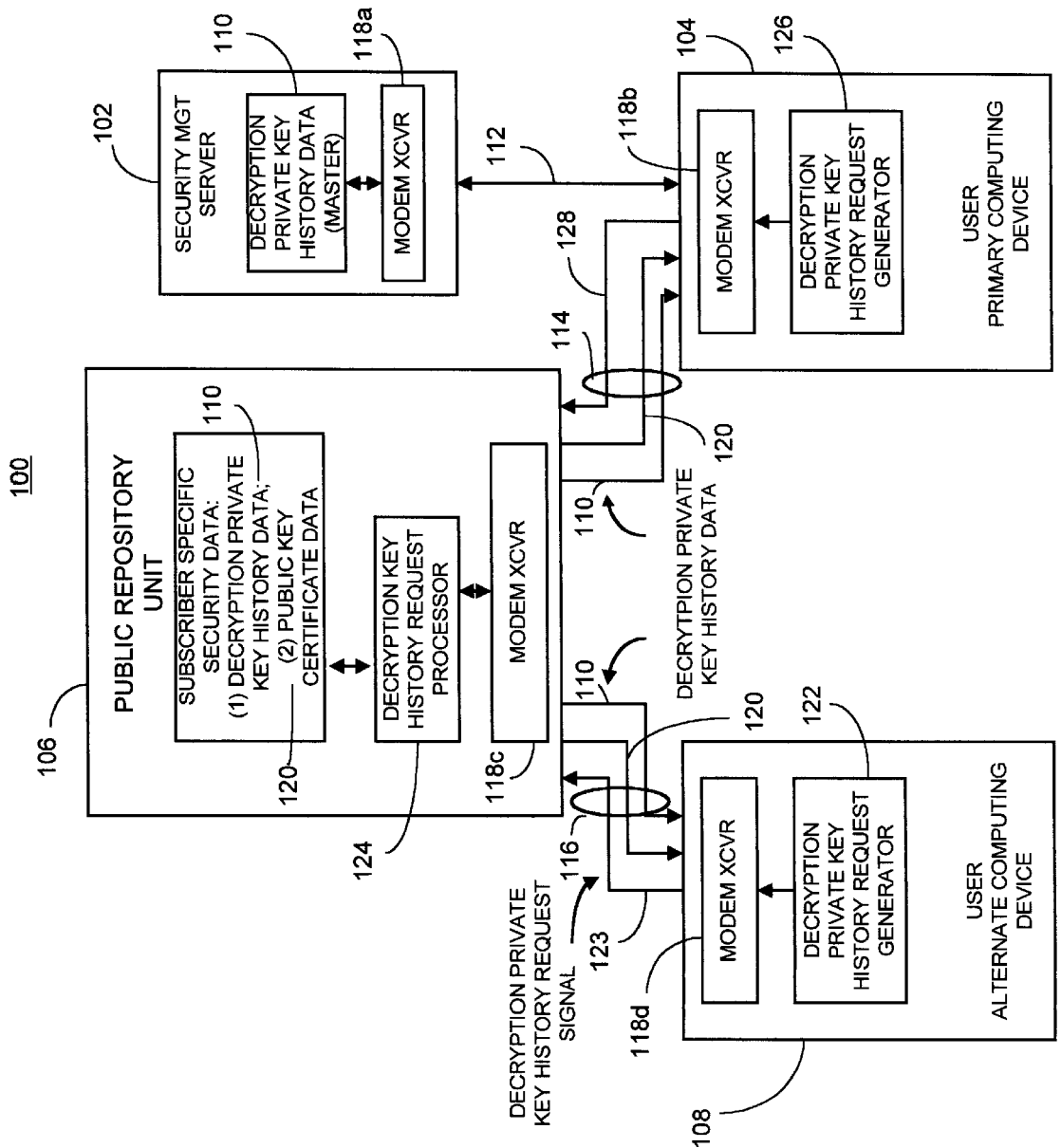
FIG. 1 is a block diagram illustrating a public key cryptography based security system in accordance with one embodiment of the invention.

FIG. 1 shows a public key cryptography based security system 100 having a security management server 102, a user primary computing device 104, a public repository unit 106 and an alternate computing device 108 typically located at a different location from the user primary computing device. The public key cryptography based security system 100 may be any suitable communication system such as a computer network, a telecommunication system or any other suitable system. The primary computing device 104 may be any suitable device that processes encrypted information. Likewise the alternate computing device (remote device) may also be any suitable device having capability to perform encryption or decryption or other cryptographic operations.

The security management server 102 contains decryption private key history data 110 stored on a secured database. During initialization, the security management server 102 may generate the decryption private keys (such as a 1,000 bit RSA key string) and the associated encryption public key as the encryption public key pair. This information is then sent to the primary computing device 104 over communication link 112. If desired, the primary computing device may itself generate a decryption private key and associated encryption public key and communicate the information to the security management server 102 for storage in the database 110. A new decryption private key is generated, for example by either the security management server 102 or the primary computing device 104, when the corresponding encryption public key certificate is noncurrent, such as when the certificate is revoked, or when the validity period of the corresponding encryption public key certificate expires or is soon to expire, as known in the art. When the public key is revoked or an expiry period has lapsed, the old decryption private key is retained and stored as decryption private key history data 110. The new private key is also included in the new key history. The updating of the decryption private key history data 110 can occur by primary computing device 104 communicating this new data to public repository unit 106; or by management server 102 propagating this information to public repository unit 106 by a communications channel between management server 102 and public repository unit 106; or by primary computing device 104 or alternate computing device 108 communicating this information to public repository 106, and then public repository unit 106 propagating it back to management server 102. As an end result the private key history data 110 in both management server 102 and in the public repository unit 106 is updated and contains the updated private key history data 110. The decryption private key history data 110 is per user security data since it is associated with a given user and is used to facilitate secure storage or secure communications with other users in the system.

The public repository 106 may be an openly accessible database with some access control protection (e.g., password control), such as a password protected database accessible through the Internet, Public Switch Telephone Network (PSTN) or other suitable communication link. The security management server 102 is preferably a nonpublic server that in not openly accessible.

Figure 3:
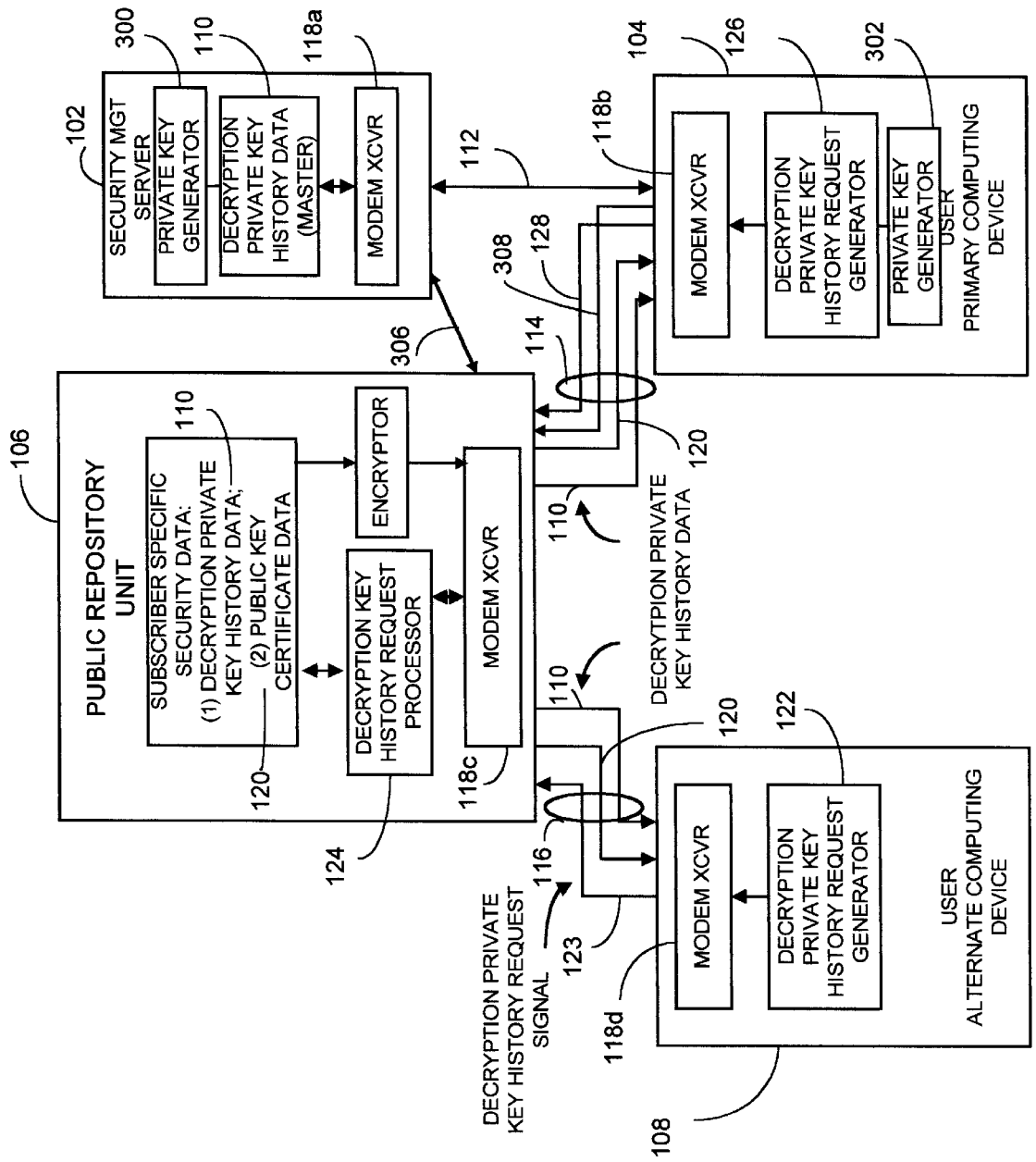
FIG. 3 is a public key cryptography based security system in accordance with another embodiment of the invention.

The security management server 102 in addition to the decryption private key history data 110 may also store master copies of other per user security data such as encryption public key certificate data, signing public key certificate data, signing private key data, key agreement (e.g. Diffie-Heilman) private key data and public key certificate data, and trusted verification public key data, all corresponding to a certificate issuing unit (certification authority), as known in the art. The per user security data could also include security policy data, such as data representing the type of decryption algorithm to use, password rules or other suitable data. The public key repository unit 106 is connected to the primary computing device 104 through a communication link 114, such as an Internet link or other suitable communication link. The public repository unit 106 is also coupled to the security management server 102 through the primary computing device 104 to obtain the decryption private key history data 110. (Alternatively, the public repository unit 106 may be linked by a communications channel 306 directly to the server 102, as shown in FIG. 3.) Unlike conventional systems, the public repository unit 106 stores remotely accessible per user security data, such as the decryption private key history data 110. It may also store user public key certificate data, and optionally additional user-specific data such as user security preferences or other profile data. The decryption private key history data 110 is preferably stored on a per subscriber or per user basis such that any user may roam to use alternate computing device 108.

The alternate computing unit 108 is in communication with the public repository unit 106 through a communication link 116, such as an Internet communication link or other suitable communication link. The alternate computing device 108 does not permanently store copies of each user's own decryption private key history as does the primary computing device 104 for a particular user. However, it will be recognized that the primary unit need not permanently store the key history data. The alternate computing device might not be associated with a particular user, for example it may be used to service a number of different users over time. Instead, the alternate computing device 108 obtains the decryption private key history data 110 corresponding to a specified user from the public repository unit 106. The alternate computing device 108 then decrypts encrypted data associated with the specified user, for example accessible by the primary unit from a database (not shown) or other memory storage device or location, or in a communication session with another user. The decryption of the encrypted data is performed using at least one of the private keys in the decryption private key history data obtained from the public repository unit 106. To communicate over the communication links 112, 114 and 116, the security management server 102, the primary computing device 104, the public repository unit 106 and the alternate computing device 108 each have modem transceivers 118*a*, 118*b*, 118*c*, and 118*d* respectively. The public repository unit 108 if desired, also contains public key certificate data 120.

The alternate computing device 108 includes a decryption private key history request generator 122 for obtaining decryption private key history data from the public repository unit 106. The public repository unit 106 includes a decryption private key history request processor 124 that receives the decryption key history request 123 and processes it to determine which subscriber or user is using the alternate computing device 108 so that the appropriate decryption private key history data 110 can be communicated back to the alternate computing device 108. If desired, to facilitate public key cryptography, public key certificate data 120, is also sent with the decryption key history data 110 from the public repository unit 108 to the alternate computing device 108. This is done in response to the decryption key request data 123.

Where the subscriber primary computing device 104 needs to decrypt encrypted data, it also includes a decryption private key history request generator 126 to also generate decryption key request signal 128. In a similar fashion as described above, in response to the decryption private key history request 128, the public repository unit 108 uses its decryption private key history request processor 124 to determine the appropriate decryption private key history data 110 to forward back through the primary computing device 104 based on the identity of user requesting or otherwise obtaining the information.

The public key certificate data 120 may include encryption public key certificate data, signing public key certificate data, key agreement or other public key certificate data, or other types of certificate data such as attribute certificates, and private key data for digital signatures, key establishment or other cryptographic operations, and trusted verification public key data of one or more associated certificate issuing units to facilitate digitally signing and encrypting/decrypting data and optionally other additional cryptographic operations. With this information, the alternate computing device 108 may also obtain the requisite information to also digitally sign information as a remote unit in addition to decrypting previously encrypted information.

The decryption private key history data 110 includes a number of per user decryption private keys wherein at least one per user decryption private key corresponds to a no longer most current (no longer most recent) public key certificate. For example, when an encryption-decryption key pair (pair 1) is approaching expiry, a new pair (pair 2) may be generated to replace pair 1, in which case pair 1 is no longer most recent. In this way, messages previously encrypted using older keys or certificates such as from several years earlier, may still be accessed and read by a user from a remote location.

To help prevent unauthorized acquisition of the secret decryption keys, the public repository unit 106 also preferably includes a decryption private key encryptor or other mechanism for protecting the sensitive decryption key data. For example, the decryption private key history data and related data may be stored in encrypted form, wherein the encryption was carried out at some prior time based on a symmetric key derived from information known also to the user (and whereby, the user is able to correspondingly decrypt the data). Alternately, the encryptor may involve a software process for encrypting the decryption private key data prior to transferring the data to the user, wherein the cryptographic key for the encryption channel is based on information received from the user alternate computing device 108 or the user primary computing device 104, for example using password-based key establishment protocols as are known in the art.

The public repository unit 106 includes a database and associated data processor, but may take any other suitable form. The public repository or database allows any entity to request the per user security data and responds with the data. The decryption private key history data 110 may be stored in both the security management server (as a master copy) and in one or more public repository units.

Figure 2:
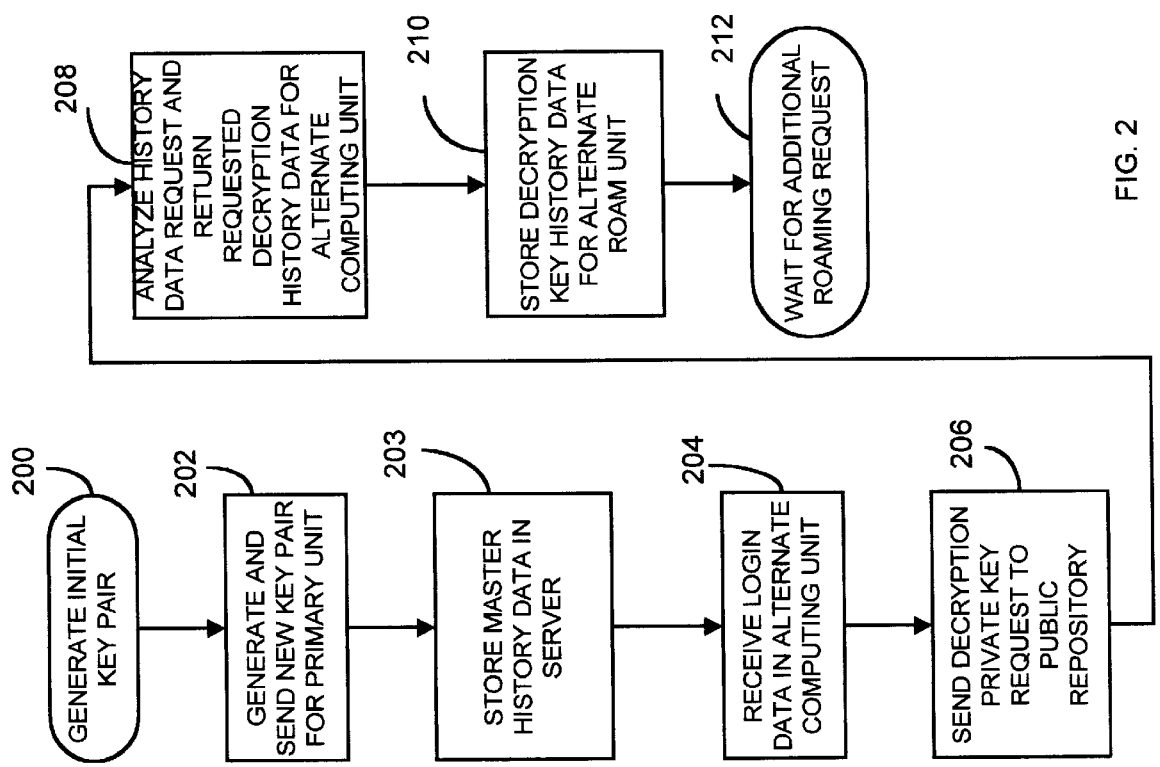
FIG. 2 is a flowchart illustrating a public key cryptography based method to facilitate secure roaming of users in accordance with one embodiment of the invention.

FIG. 2 shows the operation of the system shown in FIG. 1. In block 200, during initialization where a primary computing unit is allowed access to the system, the security management server generates a decryption private key and associated encryption public key upon request from the primary computing device 104. The decryption private key is stored in the database as well as the decryption public key as per user secret data. The decryption private key and associated encryption public key is then sent to the primary computing unit, preferably as a secure transmission over communication link 112. This is only done on a periodic basis since the decryption private key is only revoked upon a compromise or when the expiration period set forth in its corresponding certificate expires. When the decryption private key requires updating, the primary computing device 104 requests that another decryption private key and associated public key be generated. The security management server 102 then generates the new decryption private key and associated encryption public key and stores these along with the previously generated decryption private key and encryption public key, thus creating decryption key history data. The new decryption private key along with the associated encryption public key is then sent again to the primary computing device (along with the complete key history, as appropriate) to facilitate encryption and decryption of information. This is shown in block 202. As mentioned earlier, user primary computing device 104 may alternately generate the key pair, and transfer the new key pair back to security management server 102 allowing history data to be updated in server 102.

As seen in block 203, once the decryption key history information has been generated, the decryption private key history data is stored in the nonpublic memory, namely the database of the security management server. In addition, the per user security data, such as the decryption private key history data, is stored in the public remotely accessible repository unit 106 by the primary computing device 104. (See FIG. 3). Alternately, security management server 102 communicates directly with repository unit 106 to carry out this update.

As shown in block 204, the user logs into an alternate computing device such as a computing device or terminal at a remote location and enters identifying information uniquely identifying the user, or uniquely identifying a particular key history 110. For example, the identifying information may be a meaningful user name or unique address (e.g. network or email address) or a random but unique data string which can be associated to a key history 110. The identifying information could alternately include any form of password or authenticating data such as a one-time password or time-varying passcode from a passcode generator as known in the art. The alternate computing device then transfers the identification information as part of a decryption private key history request 123 via modem transceiver 118d, as shown in block 206. As shown in block 208, the public repository unit then processes the decryption key history request and sends back the decryption key history data for the associated user based on the identification information and also optionally sends with that the public key certificate data 120 and the other necessary data to facilitate decryption of new and old information. Hence, the alternate computing device 108 obtains the decryption private key history data from the publicly remotely accessible repository.

In block 210, the alternate computing unit stores the decryption private key history data for use in decrypting encrypted data associated with that user, for example data that is accessible by the primary computing device. For example, the alternate computing device may access a database through link 116 containing a user directory stored therein by the user when operating primary computing device 104.

It will be recognized that the primary computing and alternate computing devices may be the same type of devices with the same software programs thereon, or they may be different types of devices. It will also be recognized, that in addition to the decryption private key history data, other data such as executable programs and other information may be stored and transferred from the public repository unit to an alternate computing unit to make the alternate computing device behave as though it is the primary computing device to the user.

Referring to FIG. 3, the security management server includes a decryption private key generator 300 (and optionally, a private signing key generator)—for generating new decryption private keys and associated encryption public keys (and optionally, other keys including private signing keys and corresponding verification public keys). In this embodiment, the security management server is the only device that is allowed to generate the secret decryption keys. Alternatively if desired, the subscriber primary computing device may include an encryption key pair generator 302 (to generate encryption-decryption key pairs) and optionally a signature key pair generator (to generate a signing-verification key pair) to perform the key generation function in place of the key generator 300. In the preferred embodiment, the generation of signature key pairs is performed in the user primary computing device, and encryption key pairs may or may not be generated in the security management server. Independent of where key pairs are generated, the server 102 and computing device 104 obtain a copy of the decryption private key. Either the security management server or the primary computing device may update per user security data for the public repository unit 106. When a new decryption private key is required, the device containing the decryption private key generator 300 or 302 generates new decryption private key data. In the case where this is done by the primary computing device, the new private key is sent to the security management server wherein the security management server updates the per user security data for that user with the new decryption private key to update the decryption private key history. The security management server then communicates the decryption private key history data 110 directly to the public repository unit 106 via communication link 306.

Alternatively, the primary computing device 104 may submit the new per user security data directly to the public repository unit 106 as indicated by data 308 over link 114. In this way, the security management server or the primary computing device generates a new per user decryption private key. Thus alternate embodiments allow either of these to update the decryption private key history data 110 in public repository unit 106. For example, the security management server generates the new information, the primary computing unit 104 receives the new private key history data 110 via its modem transceiver 118b and communicates the new decryption private key history data 110 for storage by the public repository via link 128. Alternatively, the security management server 102 communicates the new decryption private key history data 10 for storage by the public repository unit 106, after which the user alternate computing device 108 or the user primary computing device 104 could acquire the (new) key history data from the public repository unit. The primary computing unit 104 having the decryption private key generator 302 and optionally the signing private key generator may also generate the new per user decryption private key and updates the decryption private key history data 110 in both its database and the security management server. In addition it communicates the new decryption private key history data 110 to the public repository unit 106.

It should be understood that the implementation of other variations and modifications of the invention in its various aspects will be apparent to those of ordinary skill in the art, and that the invention is not limited by the specific embodiments described. For example, the decryption private key may be an RSA private key, a long-term Diffie-Hellman private key (also called a static Diffie-Hellman private key), an ElGamal private key, an elliptic curve variation of any of these, or any suitable key. Also, the primary computing device may be used as the alternate computing device if desired. In this case, the primary device is considered the device with locally stored key history data. In addition, the primary unit need not store the key history data locally but may store the information in a remote database or other storage location. It will also be recognized that multiple public repositories may be used. It is therefore contemplated to cover by the present invention, any and all modifications, variations, or equivalents that fall within the spirit and scope of the basic underlying principles disclosed and claimed herein.

What is claimed is:

1. A public key cryptography based security system to facilitate secure roaming of users among at least a first computing device and a second computing device comprising:

storage means for storing per user security data including decryption private key history data that includes multiple private decryption keys associated with the same user;

public repository means, operatively coupled to the storage means, for storing remotely accessible per user security data including the decryption private key history data stored in the storage means to facilitate portable security capabilities; and the second computing device, in operative communication with the public repository means, for obtaining the decryption private key history data including the multiple private decryption keys from the public repository means to facilitate decryption of encrypted data.

2. The public key cryptography based security system of claim 1 wherein the first computing unit is a primary computing unit and the second computing unit is an alternate computing unit.

3. The public key cryptography based security system of claim 1 wherein the first computing device, is operatively coupled to the storage means and has a decryption private key history request generator for obtaining decryption private key data from at least one of: the public repository means and the storage means, to facilitate decryption of data.

4. The public key cryptography based security system of claim 3 wherein the public repository means includes means for communicating the requested decryption private key data in response to receiving the decryption private key history request from the first computing unit.

5. The public key cryptography based security system of claim 1 wherein the public repository means provides decryption private key history data to the second computing device.

6. The public key cryptography based security system of claim 1 wherein the second computing device includes a decryption private key history request generator for obtaining decryption private key history data from the public key repository means.

7. The public key cryptography based security system of claim 6 wherein the public repository means includes means for communicating requested decryption private key history data in response to receiving the decryption private key history request.

8. The public key cryptography based security system of claim 1 wherein the public repository means includes per user security data further including at least one of: encryption public key certificate data, signature verification public key certificate data, signing private key data, policy data and trusted verification public key data of certificate issuing units.

9. The public key cryptography based security system of claim 1 wherein the storage means includes means for generating a new per user decryption private key and updating the decryption private key history data in accordance therewith.

10. The public key cryptography based security system of claim 9 wherein the first computing unit receives the updated decryption private key history data from the storage means and communicates the updated decryption private key history data for storage by the public repository means.

11. The public key cryptography based security system of claim 9 wherein the storage means communicates the updated decryption private key history data for storage by the public repository means.

12. The public key cryptography based security system of claim 1 wherein the first computing unit includes means for generating a new per user decryption private key and updating the decryption private key history data in at least one of: the first computing unit, the public repository means and the storage means.

13. The public key cryptography based security system of claim 1 wherein the first computing unit includes means for generating a new decryption private key, transferring the new decryption private key to the storage means, and wherein the storage means includes means for updating the decryption private key history and for updating the decryption private key history in the public repository means.

14. The public key cryptography based security system of claim 1 wherein the decryption private key history data includes a plurality of per user decryption private keys wherein at least one per user decryption private key corresponds to a non-current public key certificate.

15. A public key cryptography based security system to facilitate secure roaming of users among at least a first computing device and a second computing device comprising:

storage means for storing per user security data including decryption private key history data wherein the decryption private key history data includes a plurality of per user decryption private keys associated with each of a plurality of users wherein at least one per user decryption private key corresponds to a non-current public key certificate;

public repository means, operatively coupled to the storage means, for storing remotely accessible per user security data on a per user basis, including encrypted decryption private key history data stored in the storage means wherein the decryption private key history data includes a plurality of per user decryption private keys wherein at least one per user decryption private key corresponds to a non-current public key certificate, and encryption public key certificate data to facilitate portable security capabilities; and the second computing device, in operative communication with the public repository means, for obtaining the encrypted decryption private key history data including the multiple private decryption keys and the encryption public key certificate data from the public repository to facilitate decryption of encrypted data.

16. The public key cryptography based security system of claim 15 wherein the second computing device includes a decryption private key history request generator for obtaining decryption private key data from the public key repository means.

17. The public key cryptography based security system of claim 16 wherein the public repository means includes means for communicating requested decryption private key history data in response to receiving the decryption private key history request.

18. The public key cryptography based security system of claim 17 wherein the public repository means includes per user security data further including at least one of: signing public key certificate data, policy data, signing private key data and trusted verification public key data of certificate issuing units.

19. The public key cryptography based security system of claim 15 wherein the public repository means provides decryption private key history data to the second computing device.

20. A public key cryptography based method to facilitate secure roaming of users among at least a first computing device and a second computing device comprising the steps of:
storing per user security data including decryption private key history data that includes multiple private decryption keys associated with the same user;
storing, in a public remotely accessible repository, per user security data including the stored decryption private key history data to facilitate portable security capabilities; and
obtaining, for the second computing device, the decryption private key history data including the multiple private decryption keys from the public remotely accessible repository to facilitate decryption of encrypted data.

21. The public key cryptography based method of claim 20 wherein the step of obtaining the decryption private key history data includes obtaining, using a private key history request generator, decryption private key history data from the public repository.

22. The public key cryptography based method of claim 21 including communicating the requested decryption private key history data in response to receiving the decryption private key history request from the first computing unit.

23. The public key cryptography based method of claim 20 wherein the second computing device includes a decryption private key history request generator for obtaining decryption private key history data from the public repository.

24. The public key cryptography based system of claim 23 including communicating requested decryption private key history data in response to receiving the decryption private key history request.

25. The public key cryptography based method of claim 20 wherein the public repository includes per user security data further including at least one of: encryption public key certificate data, signature verification public key certificate data, policy data, signing private key data and trusted verification public key data of certificate issuing units.

26. The public key cryptography based security method of claim 20 including providing decryption private key history data to the second computing device.

27. The public key cryptography based method of claim 20 including generating a new per user decryption private key and updating the decryption private key history data in accordance therewith.

28. The public key cryptography based method of claim 27 including the steps of: receiving, by the first computing unit, the updated decryption private key history data from the non-public memory and communicating the updated decryption private key history data for storage in the public repository.

29. The public key cryptography based method of claim 27 including the step of communicating the new decryption private key history data for storage by the public repository.

30. The public key cryptography based method of claim 20 including the steps of generating a new per user decryption private key, updating the decryption private key history data in accordance therewith in both the first computing unit and in a storage device, and communicating the new decryption private key history data to the public repository.

31. The public key cryptography based method of claim 20 including the steps of: generating a new decryption private key, transferring the new decryption private key to the storage means, updating the decryption private key history data and updating the decryption private key history data in the public repository.

32. The public key cryptography based method of claim 20 wherein the decryption private key history data includes a plurality of per user decryption private keys wherein at least one per user decryption private key corresponds to a non-current public key certificate.

33. A public key cryptography based method to facilitate secure roaming of users among at least a first computing device and a second computing device comprising:
storing per user security data including decryption private key history data wherein the decryption private key history data includes a plurality of per user decryption private keys associated with each of a plurality of users wherein at least one per user decryption private key corresponds to a non-current public key certificate;
storing, in a remotely accessible public repository, per user security data on a per user basis, including encrypted decryption private key history data stored in the storage means wherein the decryption private key history data includes a plurality of per user decryption private keys wherein at least one per user decryption private key corresponds to a non-current public key certificate, and encryption public key certificate data to facilitate portable security capabilities; and
obtaining the encrypted decryption private key history data including the multiple private decryption keys and the encryption public key certificate data from the public repository,
decrypting at least one private key in the encrypted decryption private key history data, and
decrypting encrypted data previously accessible by the first unit, based on the decryption private key history data stored in the public repository.

34. The public key cryptography based method of claim 33 including generating a decryption private key history request to request decryption private key data from the public key repository.

35. The public key cryptography based method of claim 34 including communicating requested decryption private key history data in response to receiving the decryption private key history request.

36. The public key cryptography based method of claim 35 wherein the public repository includes per user security data further including at least one of: signing public key certificate data, policy data, signature verification private key data and trusted verification public key data of certificate issuing units.

37. A public key cryptography based security system to facilitate secure roaming of users among at least a first computing device and a second computing device comprising:
storage means for storing per user security data including decryption private key history data that includes multiple private decryption keys associated with the same user; and public repository means, operatively coupled to the storage means, for storing remotely accessible per user security data including the decryption private key history data stored in the storage means to facilitate portable security capabilities.

38. The public key cryptography based security system of claim 37 wherein the public repository means includes means for communicating requested decryption private key history data in response to receiving the decryption private key history request.

39. The public key cryptography based security system of claim 37 wherein the public repository means includes per user security data further including at least one of: encryption public key certificate data, signature verification public key certificate data, signing private key data, policy data and trusted verification public key data of certificate issuing units.

40. The public key cryptography based security system of claim 37 wherein the storage means includes means for generating a new per user decryption private key and updating the decryption private key history data in accordance therewith.

41. The public key cryptography based security system of claim 40 wherein the first computing unit receives the updated decryption private key history data from the storage means and communicates the updated decryption private key history data for storage by the public repository means.

42. The public key cryptography based security system of claim 37 wherein the storage means communicates the updated decryption private key history data for storage by the public repository means.

* * * * *